United States Patent Office 2,930,768
Patented Mar. 29, 1960

2,930,768
FORMED POLYMERIC MASSES FROM DIVALENT METAL ACRYLATES AND PROCESSES FOR PRODUCING THEM

Robert P. Hopkins, Ardsley, Pa., assignor to Rohm & Haas Company, Philadelphia, Pa., a corporation of Delaware No Drawing. Application September 10, 1954
Serial No. 455,348
17 Claims. (Cl. 260—2.2)

This invention relates to the production of formed divalent metal polyacrylate masses having a continuous-phase gel structure which is of rubber-like character in the wet condition at normal temperatures. The masses may have various shapes and may have the form of films, sheets, tubes, rods, rings and so forth. They comprise as the major or entire component of the mass a polymer of a divalent metal acrylate, such as calcium acrylate. Such masses may contain minor proportions of other auxiliary substances within the gel continuum for the purposes of reinforcing the mass or for other special purposes adapting the mass to particular uses as will be pointed out hereinafter.

The term "continuous-phase" is intended to define the condition in which there are substantial forces of internal cohesion within the polymer mass apparently the result of coalescence or binding by mutual fusion of portions thereof. It is to be contrasted with the condition of a mass of individual polymer particles that may be pressed together but are not coalesced and consequently lack substantial cohesive forces. By the term "rubber-like" is meant the quality of flexibility and elasticity of such character that there is substantially complete recovery from large extents of elongation.

It is known to polymerize divalent metal acrylates, such as calcium acrylate, with the production of powders or of pasty or structurally weak masses which are friable and lack internal cohesion both in wet and dry conditions. Calcium polyacrylate and other divalent metal polyacrylates are known to have valuable metal ion-exchange properties and also limited water-swelling capacity adapting them for use as a gasketing or packing material in systems which involve heat interchange between aqueous liquids or non-aqueous non-polar organic liquids such as liquid hydrocarbons. However, these properties cannot be used to the best advantage by pasty or weak masses which have insignificant tensile strength and in many cases have inadequate strength even to support themselves such as when films or sheets of commercially practical size are used under the stresses and pressures involved in normal operation of the systems, such as those caused by turbulence and hydrostatic pressure of the flowing liquids. For ion-exchange purposes, the particulate polymer gums up in aqueous media, thereby reducing the effective area of the polymeric mass. Similarly, a weak mass of the polymer when used as a gasket tends to be forced out too easily from the space in which it should be confined under the pressure of the opposed surfaces at the joint because of inadequate internal cohesive force of the polymeric mass.

The present invention provides new and improved formed masses of polymers of divalent metal acrylates of continuous-phase type and methods of making them. The new formed masses have a characteristic rubber-like gel condition when equilibrated with water at normal temperatures. By "equilibrated with water" is meant the condition of maximum retention of water on soaking of the mass in water over prolonged periods of time at any given temperature. The new formed polymeric masses have high internal cohesion and good mechanical properties when dry. Certain of them having a hydrophobic cation, such as zinc and barium, have high wet tensile strengths, for example, being from two to ten times that of polymeric masses formed of the corresponding polymer by prior art processes without the use of internal reinforcing substances on the materials. Calcium and magnesium polyacrylate masses of the present invention have lower wet tensile strengths apparently because of their greater equilibrium water contents. They are nevertheless characterized by substantial wet tensile strengths and very high rubber-like elasticity. The calcium polyacrylate mass of the present invention when equilibrated with water at normal temperatures around 25° C. is a rubber-like gel which retains its flexibility through a wide range of temperature while in the wet condition. At elevated temperatures starting about 80° C., it becomes rigid and highly resistant to water. The rubber-like water-equilibrated gel retains its flexibility down to about —35° C. The corresponding rubber-like gel formed by water-equilibration of magnesium polyacrylate at 25° C. remains flexible to about 95° C. and —40° C. Films of the more hydrophobic types such as those of zinc and barium polyacrylates, when equilibrated with water at 25° C., have a somewhat narrower temperature range of flexibility than calcium polyacrylate.

In general, the films, sheets, tubes, or other shaped articles of the present invention are formed directly from a monomer such as the acrylate of calcium, zinc, strontium, barium, or magnesium. A dispersion or solution of the monomer provided with catalyst is distributed into the approximate form which the ultimate polymer is to have. The distribution may involve the operation of coating a substrate or base and the polymerization of the distributed medium on such base or substrate. Again, this distribution may involve the introduction of the polymerization medium into a mold as in the type of operation known as casting or the distribution may involve the continuous passage of the polymerization medium through a polymerization zone and subsequent cooling zone of an extrusion nozzle or device whereby the formed articles are obtained continuously as a sheet, band, tube, rod, or the like.

By whatever specific procedure the polymerization medium is distributed into the shape or form desired, certain conditions must be observed in order to produce the continuous-phase masses of the present invention and to avoid the production of weak or pasty masses which have little or no internal cohesion. Several procedures may be employed for producing the new formed masses, each of which involves certain critical conditions as will be pointed out in the discussion of each procedure.

More particularly, one procedure for producing the polymers involves the introduction of a polymerization catalyst into an aqueous solution containing at least 5% and preferably at least 20% by weight of the monomer to be polymerized. This solution is distributed in the form desired as mentioned hereinabove and maintained at a temperature below a certain limit throughout the period of polymerization. The polymer formed below this critical temperature coalesces into a continuous-phase gel containing a large amount of water. This gel mass slowly loses water until an equilibrium condition is reached wherein it contains a certain proportion, the amount depending upon the temperature and the particular metallic cation of the polymer. The polymeric mass thus formed can be stored, shipped and used in this wet condition. Alternatively, the coalesced polymer can be soaked in water, if desired, at a temperature which does not exceed the critical temperature mentioned to equilibrate it with water and, if desired, to remove any residual impurities. By thus soaking the mass in water, it loses water and equilibrates more rapidly than it does in the polymerization medium where less water is present.

This critical temperature is important and of vital concern to the production of the new polymeric masses since, if the polymer is dried above such temperature, the coalesced continuous-phase gel structure desired is not obtained and a weak, crumbly mass is produced instead. A film so produced shatters or distintegrates on drying. The critical temperature varies with the particular cation of the monomer and, with any given divalent metal cation, the critical temperature apparently depends on the average molecular weight of the polymer. Therefore it is evident that the critical temperature depends on the various polymerization conditions, including temperature, type of catalyst, monomer concentration, catalyst concentration, and presence or absence of, as well as the relative amount of, other substances. It is therefore impractical to precisely designate the critical temperature under all possible conditions. The value of this temperature can be readily determined for any given set of conditions, however. Approximate ranges of values for most practical operations with typical cations can be set forth. For example, when 5% calcium acrylate in water is used, the critical temperature is generally in the range of 25° C. to 30° C.; at 10% concentration, this temperature is generally in the range of 30° C. to 35° C.; at 20% it generally rises to 35° C. to 40° C.; and at 30% monomer concentration which is substantially a saturated condition, the critical temperature is generally in the range of 40° C. to 45° C. Solutions of zinc or barium acrylate having from 5% to 30% concentration generally have critical temperatures in the range from 15° to 30° C. Magnesium acrylate is exceptional in that under most conditions of polymerization its critical temperature is generally above the boiling point of the monomer solution.

The critical temperature may be referred to in various ways. For example, it may be called the "critical wet coalescence temperature" or "critical continuous-phase temperature" in view of the fact that the production of the continuous-phase rubber-like mass by the present invention depends on coalescence in the wet condition at a temperature no higher than this limiting temperature. By virtue of the fact that it appears that water is not soluble in the polymer above the critical temperature, but that at the critical temperature and temperatures below it, water is soluble in the polymer, the critical temperature may be referred to as the "limiting temperature of solubility of water in the polymer."

The use of temperatures of drying or dehydration of the polymerized mass lower than the critical temperature is desirable since the extent of coalescence, the internal cohesion and mechanical properties improve progressively as the temperature is lowered. Preferably the temperature of dehydration should be at least 10° C. below the critical temperature to assure that a borderline condition is not encountered in the product and that good mechanical properties are obtained therein. Operation at 0° C. to 10° C. is highly practical and produces excellent products.

The second procedure differs from the first only in that polymerization may be effected in water at any temperature either below or above the critical temperature just mentioned, but the polymer is coalesced from the polymerization medium by cooling to a point below, and preferably at least 10° C. below, the critical temperature before water is removed or at least before such an amount of water is removed that the remainder thereof is less than the amount that is soluble in the polymer at the critical temperature. It is essential that coalescence be effected in the presence of at least that amount of water which is soluble in the polymer at the critical temperature and that such coalescence takes place at a temperature which is no higher than the critical temperature and is preferably somewhat below for practical operation.

A third procedure is to introduce the monomer into a non-aqueous water-miscible liquid such as glycerol, ethylene glycol, formamide, or diethanolamine. They polymerization in the presence of a catalyst may be effected in this non-aqueous medium at any temperature above or below the critical temperature described above. It is essential in this procedure, however, to pour the reaction mass after polymerization and cooling to a temperature below the critical temperature into water which is no higher than the critical temperature to effect coalescence.

When it is desired to produce a polymer of a water-insoluble or poorly water-soluble (e.g. not over 5% solubility) acrylate of a metal, such as copper or silver (whether monovalent, divalent, or of other valency) the polymer of a water-soluble divalent monomer, such as the acarylate of magnesium, calcium, zinc, strontium, or barium, may be made by any of the first three procedures and then the coalesced polymer is treated, before drying, in an aqueous solution of a soluble salt of the metal whose polyacrylate is desired.

Regardless of which of the procedures discussed above are used for the production of the formed masses, the polymerization catalyst used may be of the free radical type such as acetyl peroxide, t-butyl hydroperoxide, one of the persulfates such as ammonium, potassium, or sodium persulfate used in amounts of about ½% to 10% based on the weight of monomer. A redox system may be used in which the catalyst, especially the persulfate catalyst, may be used in conjunction with a reducing agent such as sodium thiosulfate or sodium hydrosulfite. Copper, iron, and lead salts may be used in small amounts to activate the redox catalyst system. The amounts of such salts may be from 0.1 to 0.3% based on the weight of monomer.

The concentration of the monomer must be at least 5% by weight in the water solution since it has been found that a continuous-phase rubber-like gel mass cannot be readily formed at concentrations appreciably less than this amount. Preferably, the concentration of monomer is at least 20% up to its saturation limit. The use of the higher proportion of monomer is accompanied by the production of polymers having optimum properties including high molecular weight, the maximum resistance to water (that is, the solution of a minimum amount of water in the polymer) at any given temperature up to the critical temperature mentioned hereinbefore. The polymers are generally more resistant to such chemicals as acids when made from the higher concentration monomer solutions. In addition, the maximum conversion of monomer to polymer is effected in concentrations of 20% to saturation.

The temperature of polymerization may be from about −12° C. to 100° C. or higher, the temperature in any case being above the freezing point of the monomer-containing dispersion. A system catalyzed simply by one of the persulfates can be used effectively at high temperatures such as 80° C. to 110° C. or higher. When the first and preferred procedure of producing the formed polymer masses is used, the preferred catalyst system, especially at or below room temperature, is that using a persulfate for initiation polymerization in conjunction with reducing agent for accelerating the reaction (the redox system) because of the more rapid polymerization that can be obtained thereby. However, acetyl peroxide is also useful at room temperature. The time required for the polymerization may vary from a few minutes to overnight depending upon the monomer concentration, catalyst type, temperature, and so on.

After coalescence of the polymer while still in the wet gel condition, excess water may be removed from the gelled mass by draining or drying and optionally the gelled mass may be washed with water or other solvent for materials to be removed such as residual catalyst and/or monomer. The polymerization mass may be dried or dehydrated by immersion and soaking in a concentrated salt solution, such as of calcium chloride, or in a water-miscible solvent, such as acetone, dioxane, methyl ethyl ketone, and the lower alcohols. Washing, if done, should be effected at a temperature which is not over the critical temperature for the particular polymer and preferably is performed before drying of the polymer mass.

Generally, the polymeric mass present at the conclusion of the polymerization is a white mass that is pasty above the critical temperature and is or becomes gelatinous at or below the critical temperature. In either case, water present is sorbed within the mass. If the mass is directly dried at the critical temperature, an opaque white coalesced gel is obtained. When the wet mass is sufficiently cooled below the critical temperature before and during drying, translucent or clear masses are obtained depending on the extent of cooling. Apparently more water is dissolved in the polymer as the temperature thereof is lowered and acts as a plasticizer to effect greater coalescence, thereby producing stronger and tougher products. In some cases, such as in the case of the zinc polyacrylate, it is helpful to soak the polymer mass obtained from the polymerization step, before drying, in cold water, such as at about 1–2° C., until the equilibrium water content at that temperature is obtained and then to dry at approximately the same temperature to obtain clear, strong products.

After coalescence to the continuous gel mass, with or without washing or soaking to equilibrium conditions in water, the mass may be dried at or below the critical temperature in any suitable manner. The water adsorption and mechanical properties are influenced considerably by the nature of the drying and may also be influenced by subsequent heating. For example, if a mass of calcium polyacrylate is dried with air at 25° C., it shows a moisture-adsorption at 25° C. of about 50% within four hours, whereas if the same mass is dried with air at 25° C. and is then heated for 32 hours at about 120° C., the dried mass showed no water-adsorption within a period of four hours at a temperature of 25° C.; it adsorbed 3% after one day and adsorbed 21% after five days.

Numerous auxiliary substances may be included within the polymerization medium so as to include within the final formed mass such materials for various purposes. For example, fillers or extenders may be included in minor amounts (i.e., less than the amount of calcium acrylate) for varying the mechanical properties of the formed mass, e.g., providing a reinforcing element for the polymer. Examples of such materials include fibers, filaments, yarns or fabrics, such as of glass, asbestos, mineral wool, cotton, silk, wool, nylon, polyvinyl alcohol (of a type which is insoluble at the temperature of polymerization), polymers of acrylonitrile containing from 75% to 100% of acrylonitrile, sawdust, rags, chopped rag, chopped paper, wood pulp, leather fibers, leather dust, and so on. Up to 20% by weight (on the weight of the polymer) of inorganic cements, such as Portland cement, hydraulic cement, etc. when included, modify the properties of the polymer mass, reducing its capacity to adsorb water and tending to reduce the rubbery elasticity of the mass when in wet condition. The auxiliary substance thus incorporated within the monomer solution may either be soluble or insoluble therein and if insoluble a dispersing agent or emulsifying agent may be used to effect the dispersion. The proportion of auxiliary substance may vary from 1% up to about 95% by weight of the monomer.

There may be incorporated within the mass other materials not intended to serve merely as fillers or extenders but to be liberated slowly from the final shaped mass in which they are contained. Examples of such materials include medicines, such as antihistamines, bactericides, substances which may be used for agricultural purposes such as seeds, fungicides, bactericides, fertilizers, trace minerals; and also perfumes or deodorants.

As pointed out hereinabove, the polymerization medium may be distributed into the desired form in various ways. Thus, it may be applied to coat paper, felt, wood, a textile fabric, leather, a fiber glass cloth or mat, porous ceramic articles, plaster and so forth. The substrate may have any form such as flat or curved, that of a sheet, cylinder, tube or pipe. The coated article is then subjected to polymerization conditions preferably in the absence of air or oxygen to prevent any inhibiting effect thereof. When the polymerization solution is of low viscosity, it may be bodied up with a small amount of a thickener to the proper viscosity before application. Ordinarily, such additional thickener is unnecessary particularly when highly concentrated monomer solutions containing appreciable amounts of auxiliary substances are used. The coated article is then polymerized by either of the first or second procedures, preferably by the first where its temperature is maintained below the critical temperature for the given system.

When forming is by a molding or coating procedure, it is desirable to employ suitable release agents. For this purpose, the surfaces of the mold may be glazed with a silicone resin, as is now conventional practice. Alternatively, or in addition suitable oils or waxes may be employed, of which the epoxidized oils disclosed in U.S. Patent No. 2,485,160 are representative. The surfaces of the mold may be coated with a plasticized polyvinyl chloride or with polytetrafluoroethylene. Galvanized iron surfaces need no release agent. The final shaped mass may be subsequently cut to final dimensions if such is necessary.

Besides the ion-exchange uses and gasket uses of polymeric calcium acrylate which the shaped masses of polymer produced herein are adapted to serve in an improved manner, the products of the present invention find numerous additional applications. For example, a continuous tube of polymeric divalent acrylate salts formed by extrusion is cut at intervals to provide narrow shrinkable annuli or bands adapted to be placed around the juncture of bottles with corks, caps, or stoppers to form a decorative seal upon dehydration thereof when exposed to the atmosphere. It has also been found that a sheet of calcium polyacrylate selectively withdraws lead ions from aqueous solutions containing both lead and nickel ions. Such sheets are extremely valuable for removing lead from gasoline to convert a lead gasoline to a white gasoline for use in marine motors and small internal combustion engines, such as are used for lawn mowers and the like. Thin films or sheets of the polymers may also be used for removing radio-active metals from waste solutions containing them. They may be used as a medium for absorbing elemental copper and other metals, especially the heavy metals like lead from any aqueous slurry, such as from a slurry of stamped or crushed ore.

The following examples are illustrative of the invention:

Example 1

To a 30% solution in water of zinc acrylate, 1% (on the weight of the monomer) of sodium thiosulfate (previously dissolved in a minimum amount of water) was added and finally there was added 1% (on the weight of the monomer) of ammonium persulfate (previously dissolved in a minimum amount of water). The solution was poured into molds made up of two plates spaced apart with a dam of plasticized polyvinyl chloride extending around the perimeter of the plates, the plates being separated from each other a distance of about 0.01 inch. The surfaces of the plates were glazed with a silicone resin and then coated with an epoxidized soybean oil produced by the procedure of Example 1 in U.S. Patent 2,485,160. The molds were maintained at about 2° C. in a refrigerated system throughout the polymerization. The sheet was removed from the mold at about 2° C. and was dried at the same temperature.

A clear sheet of zinc polyacrylate was obtained which had a wet tensile strength of about 950 pounds per square inch.

Example 2

The same procedure as Example 1 was followed except that the zinc acrylate was replaced with calcium acrylate.

Example 3

The same procedure as Example 1 was followed except that zinc acrylate was replaced with magnesium acrylate.

Example 4

The same procedure was followed as in Example 1 except polymerization was effected at 37° C. and the molds were cooled to 2° C. before removing the sheet therefrom. Thereafter the sheet was equilibrated with water by soaking therein at about 2° C. The coalesced sheet was dried at about 2° C.

Example 5

The procedure of Example 1 was followed except that polymerization was effected at 25° C. A portion of the polymer mass was dried at 25° C., a second portion was dried at 1-2° C., and a third portion was soaked in water at 1-2° C. about 24 hours and then dried at 1-2° C. The first product had a wet tensile strength of 220 pounds per square inch and a wet elongation of 110%; the second product had a wet tensile strength of 410 p.s.i. and 740% wet elongation; and the third had a wet tensile strength of 1400 p.s.i. and 400% wet elongation.

Example 6

The procedure of Example 1 was followed with calcium acrylate except that polymerization was effected at 50° C. and it was dried at 50° C. The film disintegrated spontaneously on drying.

A second run with calcium acrylate polymerized at 40° C. and dried at 40° C. produced a continuous-phase film, which is a hard, tough integral mass.

Example 7

The procedure of Example 5 was followed except for the substitution of a 30% barium acrylate solution for the 30% zinc acrylate solution. The product dried at 25° C. had a wet tensile strength of 230 p.s.i. and 95% wet elongation. The product dried at 1-2° C. had a wet tensile strength of 720 p.s.i. and a wet elongation of 470%.

Example 8

A 30% solution in water of zinc acrylate was made up and ammonium persulfate and sodium thiosulfate were added as in Example 1. The polymerization medium was introduced into molds as in Example 1 and maintained at a temperature of 12° C. for a period of two days. The molded products were removed from the mold at this temperature and dried at 12° C.

Example 9

A film of zinc polyacrylate made as in Example 8 was immersed in a 0.5 N copper nitrate solution. The water-white polymer acquired an intense blue color showing the exchange of the copper ions for zinc ions in the film.

Example 10

A film of calcium polyacrylate made as in Example 2 was suspended below the liquid level within a water-immersion testing unit for testing the adhesion of paint to metal panels. A copper heating coil was suspended near the bottom of the unit just below the polyacrylate film. The paints were protected from the copper by the polyacrylate film which efficiently absorbed the copper from the water.

Similar results were obtained with sheets of barium polyacrylate and zinc polyacrylate made by the procedures of Example 1.

Example 11

A film of calcium polyacrylate made as in Example 2 was introduced into a water bath at room temperature which contained an aluminum plate spaced from the film. The plate was subsequently removed and washed with water at about 25° C. and then air dried at room temperature. The plate had deposited thereon a very thin film which remained adhered thereto and unbroken even on bending through an angle of 180°. The coating had a high gloss and was mar-resistant.

Example 12

An aqueous solution of the constitution of that in Example 8 was extruded slowly through a tubular extrusion apparatus having a long annular passage between two concentric steel tubes whose opposed surfaces were coated with polytetrafluoroethylene, the space between such surfaces being 15 mils and the average diameter of the annular space being 1.2 inches. Cold water at 15° C. was circulated through the inside tube and through a jacket around the outer tube to maintain the temperature within the polymerization medium within the annular space at a temperature of about 30° to 35° C. during polymerization. The discharge of the extrusion apparatus was submerged in cold water at 15° to 20° C. The extruded tube while still wet was cut at intervals of two inches into bands which were stored in water. The bands were applied wet to the juncture of bottles and their caps. On drying in the air, the bands shrunk into snug engagement over the joint.

Example 13

A thin (1/64 inch thick) glass fiber mat obtained by heterogeneous air-deposition of glass fibers having an average length of 0.5 inch was placed in the shallow depression (1/32 inch) of a mold for forming a sheet and a solution containing 30% calcium acrylate, 0.3% ammonium persulfate and 0.3% sodium thiosulfate was poured into the mold until filled. The mold was maintained at 30° C. for 24 hours to polymerize and coalesce the calcium polyacrylate. After removal from the mold, the product comprising the glass fiber mat embedded within the wet rubber-like calcium polyacrylate sheet was dried at room temperature (25° C.).

Example 14

By immersing and soaking the products of Examples 1, 2, and 7 in aqueous solutions of soluble salts of magnesium, lead, nickel, copper, chromium and iron for various periods of time, the original cation was replaced partially to substantially completely with the metal cation of the respective solution, the extent of replacement depending on the time of soaking. More rapid and complete replacement is obtained by continuously flowing fresh portions of the salt solution through a vessel containing the calcium polyacrylate product. After removal of the treated products, they were found to have the properties of the respective metal polyacrylates or mixed metal polyacrylates to which they were respectively converted. In every instance, a mass having strong internal cohesion and good mechanical properties was obtained. Each one, of course, had its own moisture-adsorption characteristic of its metal cation or cations.

It is to be understood that changes and variations may be made without departing from the spirit and scope of the invention as defined in the appended claims.

I claim:

1. A process for producing a formed continuous-phase, water-insoluble, mass of a polymer of an acrylate of a divalent metal comprising polymerizing in the presence of a free radical polymerization catalyst a monomeric acrylate of a divalent metal selected from the group consisting of calcium, barium, and zinc, dissolved at a concentration of at least 5% in a solvent selected from the group consisting of water and water-miscible organic solvents, the content of any water-insoluble auxiliary substances present being not more than 95% by weight of the monomeric acrylate, any of said auxiliary substances present being selected from the group consisting of organic and inorganic fibrous materials and inorganic cements selected from the group consisting of Portland cement and hydraulic cement, the total amount of any cement present being not over 20% by weight of the monomeric acrylate, coalescing the resulting polymer to form an integral continuous-phase gel mass by maintaining it in a liquid aqueous medium at a temperature which does not exceed the limiting temperature of solubility of water in the respective polymer, said temperature being from 25° C. to 45° C. for calcium acrylate at concentrations of 5% to 30%, and from 15° C. to 30° C. for zinc acrylate and barium acrylate at concentrations of 5% to 30%, allowing the coalesced gel mass to equilibrate with water by maintaining it in contact with liquid water until it contains in the gel mass the maximum amount of water that can be retained by the gel mass when standing in contact with free liquid water, and subsequently removing the resulting equilibrated coalesced gel mass from the unretained water.

2. As an article of manufacture, a gel formed by the process of claim 1.

3. A process as defined in claim 1 in which the concentration of the metal acrylate in the polymerization medium is at least 20%.

4. A process as defined in claim 3 in which the polymerization is effected above the limiting temperature of solubility of water in the polymer, and the coalesced polymeric gel mass is dried at a temperature at least 10° C. below the limiting temperature of solubility of water in the polymer.

5. A process as defined in claim 3 in which the polymerization is effected below the limiting temperature of solubility of water in the polymer, and the coalesced polymer is dried at a temperature at least 10° C. below the limiting temperature of solubility of water in the polymer.

6. A process as defined in claim 1 in which the solvent is water and the step of allowing the coalesced gel mass to equilibrate with water is effected by maintaining it in contact with the water in the polymerization medium.

7. A process for producing a formed continuous-phase, water-insoluble, mass of a polymer of an acrylate of a divalent metal comprising polymerizing in the presence of a free radical polymerization catalyst a monomeric acrylate of a divalent metal selected from the group consisting of calcium, barium, and zinc, dissolved at a concentration of at least 5% in a solvent selected from the group consisting of water and water-miscible organic solvents, the content of any water-insoluble auxiliary substances present being not more than 95% by weight of the monomeric acrylate, any of said auxiliary substances present being selected from the group consisting of organic and inorganic fibrous materials and inorganic cements selected from the group consisting of Portland cement and hydraulic cement, the total amount of any cement present being not over 20% by weight of the monomeric acrylate, coalescing the resulting polymer in the polymerization medium to form an integral continuous-phase gel mass by maintaining it in a liquid aqueous medium at a temperature which does not exceed the limiting temperature of solubility of water in the respective polymer, said temperature being from 25° C. to 45° C. for calcium acrylate at concentrations of 5% to 30%, and from 15° C. to 30° C. for zinc acrylate and barium acrylate at concentrations of 5% to 30%, transferring the coalesced gel mass from the polymerization medium into a bath of water and allowing it to equilibrate with water by maintaining it in contact with liquid water in said bath until it contains in the gel mass the maximum amount of water that can be retained by the gel mass when standing in contact with free liquid water, and subsequently removing the resulting equilibrated coalesced gel mass from the unretained water.

8. A process as defined in claim 7 in which said bath of water is maintained at a temperature of about 1° to 2° C. during the equilibration, the steps of the process defined being followed by a step of drying the gel at a temperature which does not exceed the aforesaid limiting temperature of solubility in the gel of the respective polymer.

9. A process as defined in claim 7 in which said bath of water is maintained at a temperature of about 1° to 2° C. during the equilibration, the steps of the process defined being followed by a step of drying the gel at a temperature of about 1° to 2° C.

10. A process for producing a formed continuous-phase, water-insoluble, mass of a polymer of an acrylate of a divalent metal comprising preparing a polymerization medium comprising a solution in water of at least 5% of the monomeric divalent metal acrylate selected from the group consisting of calcium, barium, and zinc, and a small proportion of a free radical polymerization catalyst, the content of any water-insoluble inorganic auxiliary substances present being not over 95% by weight of the monomeric acrylate, any of said auxiliary substances present being selected from the group consisting of organic and inorganic fibrous materials and inorganic cements selected from the group consisting of Portland cement and hydraulic cement, the total amount of any cement present being not over 20% by weight of the monomeric acrylate, distributing the medium in the physical form desired, and coalescing the resulting polymer to form an integral continuous-phase gel mass while in said physical form and in the wet condition resulting from contact with said water in liquid state at a temperature which does not exceed the limiting temperature of solubility of water in the respective polymer, said temperature being from 25° C. to 45° C. for calcium acrylate at concentrations of 5% to 30%, and from 15° C. to 30° C. for zinc acrylate and barium acrylate at concentrations of 5% to 30%, allowing the coalesced gel mass to equilibrate with water by maintaining it in contact with liquid water until it contains in the gel mass the maximum amount of water that can be retained by the gel mass when standing in contact with free liquid water, and subsequently removing the resulting equilibrated coalesced gel mass from the unretained water.

11. A process as defined in claim 10 in which the acrylate is that of calcium.

12. As an article of manufacture a gel formed by the process of claim 11.

13. A process as defined in claim 10 in which the acrylate is that of zinc.

14. As an article of manufacture, a gel formed by the process of claim 13.

15. A process as defined in claim 10 in which the acrylate is that of barium.

16. As an article of manufacture, a gel formed by the process of claim 15.

17. A process as defined in claim 10 in which the polymerization medium is a solution of the metal acrylate having a concentration of at least 20%, the coalescence is effected at a temperature of at least 10° C. below said limiting temperature of solubility of water in the respective polymer, and the polymer is dried at a temperature of at least 10° C. below said limiting temperature.

References Cited in the file of this patent

UNITED STATES PATENTS

| 1,981,102 | Hagedorn et al. | Nov. 20, 1934 |
|---|---|---|
| 2,045,080 | Hagedorn | June 23, 1936 |
| 2,401,348 | Hauser et al. | June 4, 1946 |
| 2,651,619 | De Mello et al. | Sept. 8, 1953 |
| 2,652,381 | Basdekis | Sept. 15, 1953 |